United States Patent [19]

Sato et al.

[11] Patent Number: 4,550,321

[45] Date of Patent: Oct. 29, 1985

[54] CHARGED INK-PRINTER DROPLET DETECTION

[75] Inventors: Tsutomu Sato, Yokohama; Masanori Horike, Tokyo, both of Japan

[73] Assignee: Ricoh Company, Ltd., Tokyo, Japan

[21] Appl. No.: 603,261

[22] Filed: Apr. 23, 1984

[30] Foreign Application Priority Data

Apr. 25, 1983 [JP] Japan .................................. 58-72746

[51] Int. Cl.4 .............................................. G01D 15/18

[52] U.S. Cl. ....................................................... 346/75

[58] Field of Search .......................................... 346/75

[56] References Cited

U.S. PATENT DOCUMENTS 4,417,256 11/1983 Fillmore et al. ...................... 346/75

4,426,652 1/1984 Horike et al. ......................... 346/75

4,438,440 3/1984 Jinnai et al. ........................... 346/75

*Primary Examiner*—E. A. Goldberg

*Assistant Examiner*—Gerald E. Preston

*Attorney, Agent, or Firm*—David G. Alexander

[57] ABSTRACT

A charged drop detection device for an ink jet printer is disclosed which detects a charged ink drop ejected from an ink jet head. Using a unique control signal conductor, the device is controlled in combination with a device for notifying drop charged/uncharged, phase search required/unrequired, charged drop deflection proper/improper, etc, by means of a light emitting diode and the like. The control signal conductor is connected to a microcomputer of a central control unit.

5 Claims, 10 Drawing Figures

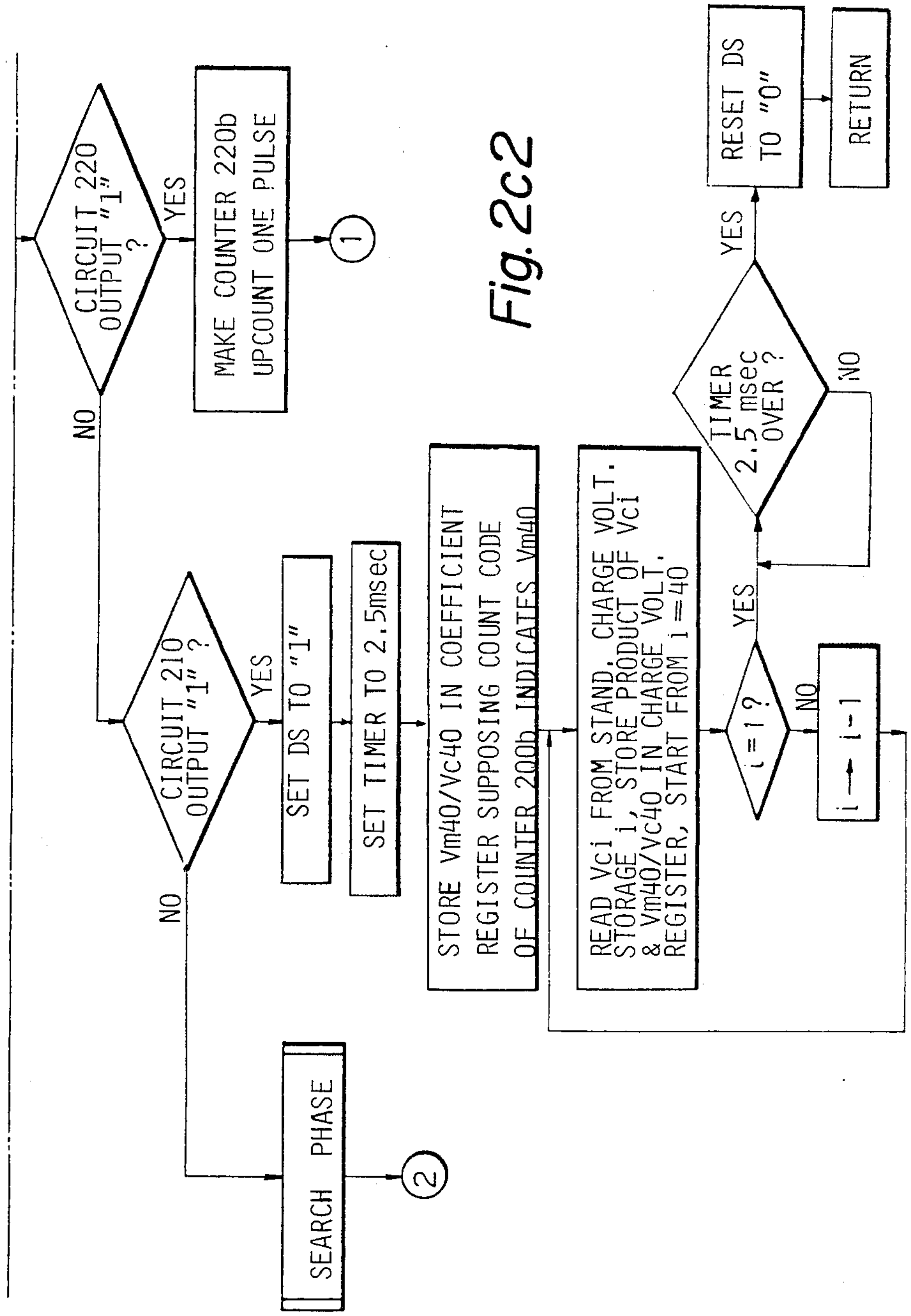
Fig. 2c2

CHARGED INK-PRINTER DROPLET DETECTION

BACKGROUND OF THE INVENTION

The present invention relates to a charge control type ink jet printer and, more particularly, to a device for detecting charging of ink droplets which are ejected from an ink jet head of the printer.

In an ink jet printer of the type described, it is a usual practice to check whether ink droplets, or drops, have been charged and whether charged droplets have been properly deflected. For this purpose, use is made of a charge detection device in which an integration circuit integrates a voltage which is induced in a charge detecting electrode when a charged droplet flies in the close vicinity of the electrode, or one in which an integration circuit integrates a charge of a charged droplet upon impingement of the charged droplet on a charge detecting electrode. For detecting the charged/uncharged condition only, the charge detecting electrode is located in a position where it will detect charged droplets among drops which have been applied with charging voltages under a predetermined condition. For the detection of amounts of deflection of charged droplets, on the other hand, the charge detecting electrode is so shaped and arranged as to detect charged droplets which fly a specific deflection path, instead of simply detecting charged droplets.

The prior art charged ink droplet detector which employs a charging electrode and an integration circuit as described above is usable for a phase search adapted to properly predetermine a timing for applying a charging voltage relative to a timing for generating a droplet, and for adequately setting an amount of deflection of a charged droplet (see, for example, Japanese Patent Application Nos. 53-1411836/1978, 53-164851/1978, 55-24303/1980 and 55-48882/1980).

In an ink jet printer, it is preferable to provide various notifications in response to charge detection concerning, for example, droplet charged/uncharged, phase search required/unrequired (search amid/ended), and deflection proper/improper (deflection control amid-/ended). Such notifications are generally implemented by visible display elements such as light emitting diodes and/or audible elements such as buzzers or the like. Such notifications are effected by a line which is independent of the control line associated with charged drop detection, e.g. a microcomputer or a logic circuit. It is sometimes practiced to use a single computer for both the control over the charged droplet detector and that over the notifying device. In any case, the charged droplet detector and the notifying device are controlled independently of each other and by independent control signal lines, resulting in a prohibitive number of control lines and, thereby, addition of numerous circuit elements.

SUMMARY OF THE INVENTION

It is therefore an object of the present invention to cut down the number of required control signal lines by combining a device for detecting charged ink droplets and a device for notifying various control states of an ink jet printer which uses the charge droplet detection device.

It is another object of the present invention to provide a generally improved device for detecting a charged ink droplet in an ink jet printer.

A device for detecting charged ink drop in an ink jet printer of the present invention comprises a charge detecting electrode for detecting a charged ink drop, an integration circuit provided with an integrator for integrating a detection signal output from the charge detecting electrode and a resetting circuit, the integration circuit clearing an integrated value within a first period of time, a notification circuit for generating a recognizable notification when energized for a second period of time which is longer than the first period of time, a control signal conductor connecting to a reset signal input terminal of the integration circuit and an energize signal input terminal of the notification circuit, and a control circuit for applying a reset command signal having a duration which is longer than the first period of time and shorter than the second period of time, temporarily in the event of charge detection.

In accordance with the present invention, a charged ink drop detection device for an ink jet printer is disclosed which detects a charged ink drop ejected from an ink jet head. Using a unique control signal conductor, the device is controlled in combination with a device for notifying drop charged/uncharged, phase search required/unrequired, charged drop deflection proper/improper and other conditions by means of a light emitting diode and the like. The control signal conductor is connected to a microcomputer of a central control unit.

The above and other objects, features and advantages of the present invention will become apparent from the following detailed description taken with the accompanying drawings.

DESCRIPTION OF THE PREFERRED EMBODIMENTS

While the device for detecting a charged ink droplet in an ink jet printer of the present invention is susceptible of numerous physical elbodiments, depending upon the environment and requirements of use, substantial numbers of the herein shown and described embodiments have been made, tested and used, an all have performed in an eminently satisfactory manner.

Figure 1A:
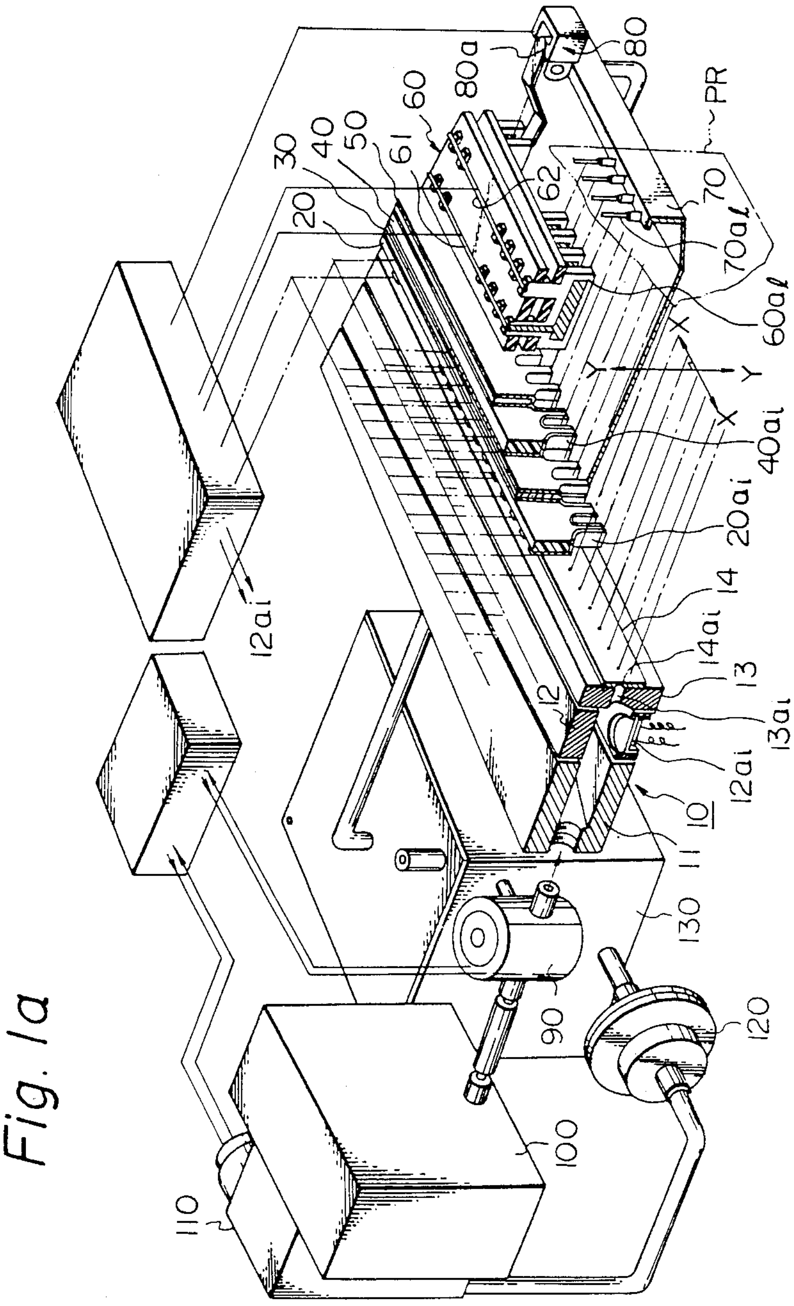
FIG. 1*a* is a perspective view of a charge control type ink jet printer, particularly its mechanical section, in which a device in accordance with one embodiment of the present invention is installed.
Figures 1, 1B:
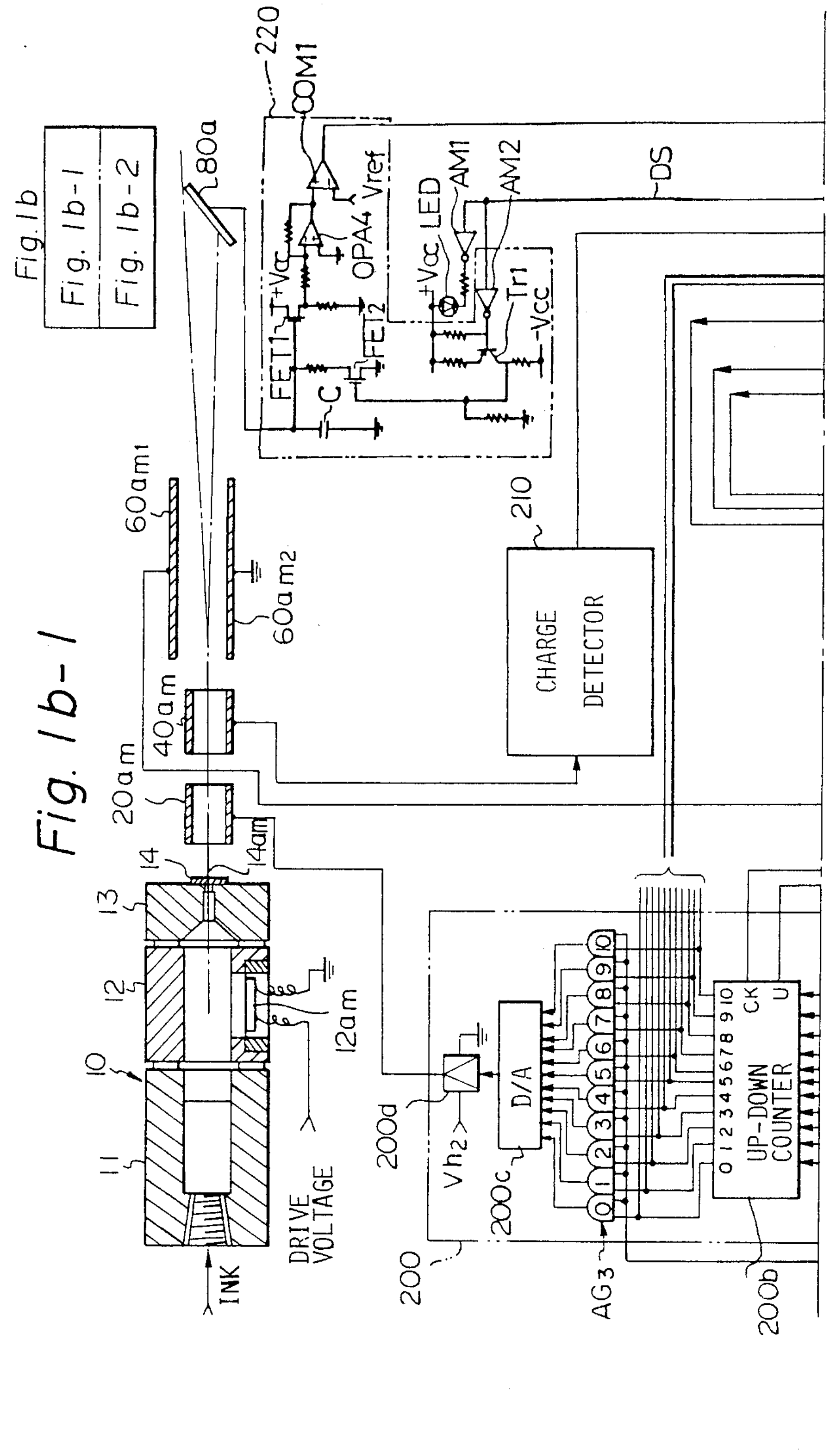
FIG. 1*b* is a block diagram representative mainly of an electrical construction associated with the printer of FIG. 1*a;*
Figures 1, 1B, 2:
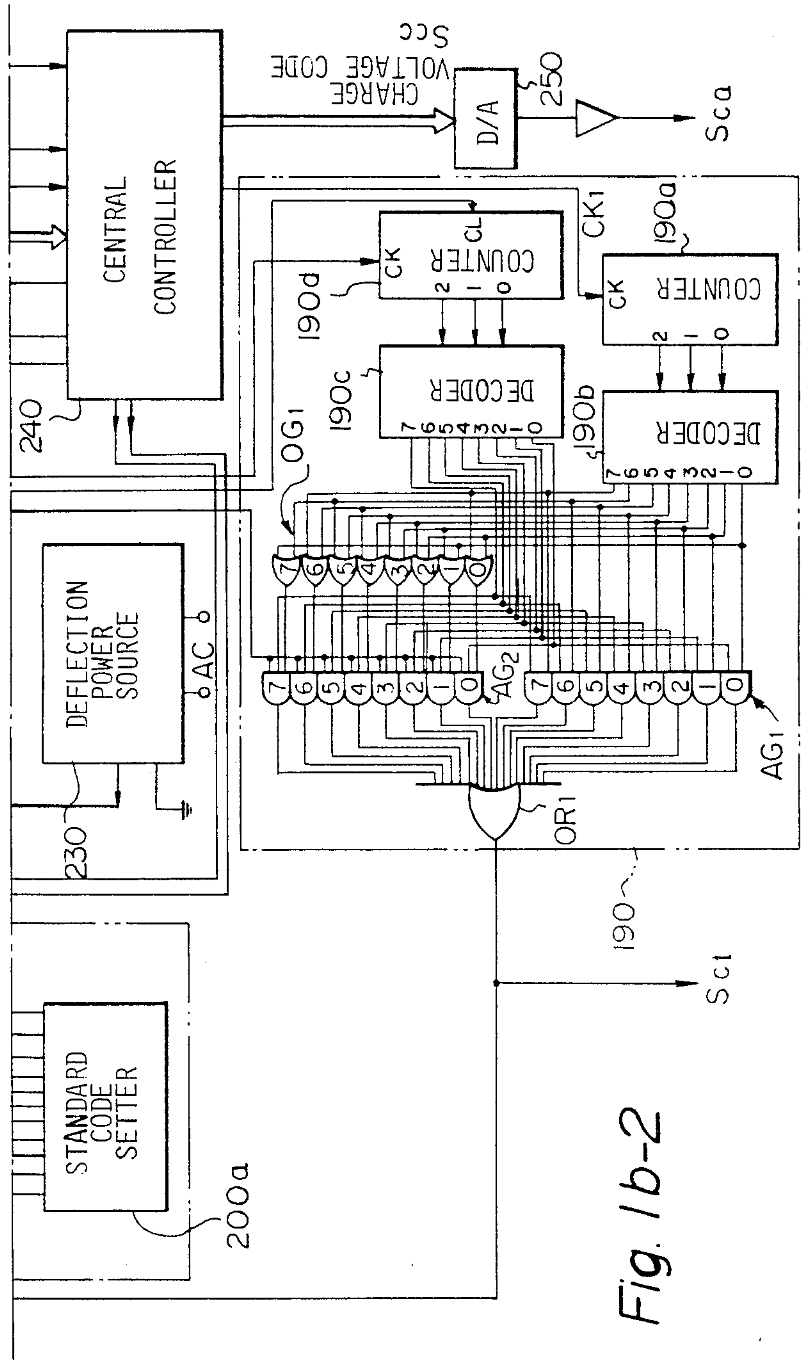
Figure 1C:
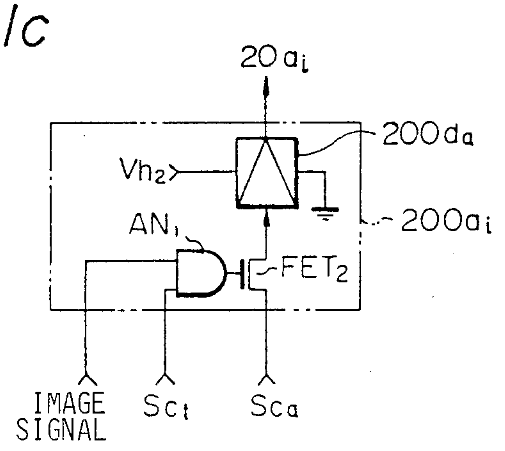
FIG. 1*c* is a block diagram of a printing charge signal generator included in the construction shown in FIG. 1*b;*
Figure 1D:
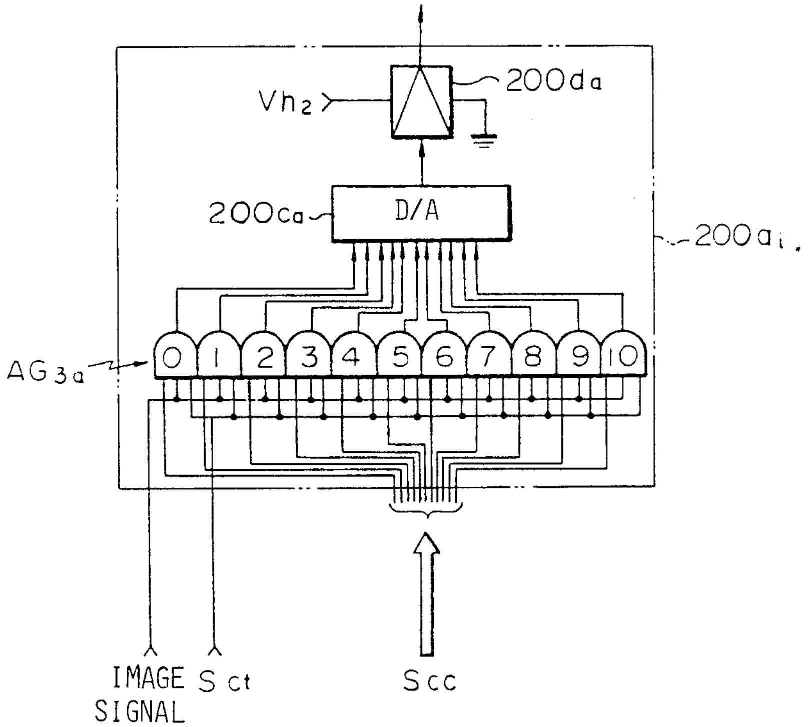
FIG. 1*d* is a block diagram showing modification to the printing charge signal generator of FIG. 1*c.

Referring to FIG. 1 of the drawing, there is shown the mechanical arrangement of a multi-nozzle type multi-value deflection ink jet recording or printing apparatus to which the present invention is applicable. FIGS. 1*b* and 1*c* show major electric arrangements of the ink jet recording apparatus individually. The mechanical arrangement includes an ink ejection head 10 which is generally made up of a member 11 defining a common ink passage therein, a vibrator support frame 12 defining a drive space therein and a nozzle plate holder 13. The support 12 carries a plurality of electrostrictive vibrators $12a_i$ rigidly on its bottom wall. When the vibrators $12a_i$ are driven synchronously with a constant frequency, pressurized ink within the space of the support 12 will be applied with pressure oscillation of a determined frequency. The nozzle plate holder 13 is formed with a plurality of ink passageways $13a_i$ at common intervals (e.g. 5 mm) throughout its recording width, the passageways $13a_i$ communicating with the internal space of the support 12. A nozzle plate 14 is bonded to a surface of the holder 13 and provided with microscopic holes $14a_i$ at locations spaced the same distance as the ink passageways $13a_i$. The nozzle plate 14 has forty-two such holes $14a_i$ for ink ejection arranged at a common interval of 5 mm, so that one ejection head can record through the width of 42×5 mm=210 mm. Besides these holes $14a_i$, the nozzle plate 14 has an additional hole at a position outside the recording area to eject droplets of ink therefrom in the same way as from the other holes.

A charging electrode plate 20 is located in front of the nozzle plate 14 with respect to the intended direction of ink ejection from the latter. In front of the electrode plate 20, there is positioned a charge detecting electrode plate 40 via the intermediary of a shield plate 30. A deflecting electrode unit 60 is positioned in front of the electrode plate 40 via a second shield plate 50. A gutter 70 is positioned in front of the electrode unit 60. The electrode plates 20 and 40 and shield plates 30 and 50 have aligned inverted U-shaped recesses which are common in number to the holes $14a_i$ of the nozzle plate 14. The electrode plates 20 and 40 individually have printed electrodes $20a_i$ and $40a_i$ on the inner surfaces of their inverted U-shaped recesses. Each of these electrodes $20a_i$ and $40a_i$ extends out individually along the surface of the electrode $20a_i$ or $40a_i$. The deflecting electrode unit 60 has a plurality of deflecting electrode plates $60a_l$ each of which is deposited with deflecting electrodes by evaporation on the front and back surfaces thereof. The deflecting electrodes on each electrode plate $60a_l$ are individually connected to first and second conductive wires 61 and 62 respectively.

The gutter 70 has upright capturing members or catches $70a_l$ at spaced locations where droplets of ink ejected from the holes $14a_i$ of the nozzle plate 14 and left non-charged (at a non-recording level) reach as indicated by dot-and-dash lines in FIG. 1. While the catches 70a are shown in the illustrated embodiment to have one-to-one positional correspondence with the holes $14a_i$ of the nozzle plate for ejecting recording droplets, an electrode unit 80 for detecting deflection position is located within a range which ink droplets from a monitoring ejection hole $14a_m$ of the nozzle plate 14 will reach (outside the recording sheet area). The charging electrodes $20a_i$ are supplied with a staircase voltage waveform which may have forty stepwise or incremental variable levels, in accordance with image signals. Where a scan line is to be recorded or printed on a recording sheet for example, the 1st to 40th levels of voltage pulses will be coupled to the charging electrodes $20a_i$ in correspondence with the forty ink droplets ejected from the individual holes of the nozzle plate so as to charge the ink droplets to the 1st to 40th levels. These charged ink droplets will then be deflected by electric fields across the deflecting electrodes 60 from a high voltage power supply 230 and impinge on the recording sheet by way of the 1st to 40th deflecting paths and spacings between the catches $70a_l$. Thus, one ink ejection hole $14a_i$ is used to print forty dots along the array of the catches $70a_l$ (this direction will hereinafter be referred to as a horizontal scan or X—X direction). A recording sheet designated PR in the drawing is moved continuously or intermittently in a direction Y—Y which is perpendicular to the direction X—X mentioned. Since the application of charging voltages is controlled in accordance with image signals and since the recording sheet PR is fed in the manner stated, data will be recorded on the recording sheet PR in both the X—X and Y—Y directions in the form of dots.

An accumulator 100 supplies the head 10 with pressurized ink through an electromagnetic valve 90 and is in turn supplied with ink under pressure from an ink reservoir 130 through a filter 120. Ink captured by the gutter 70 is routed back to the reservoir 130. The electromagnetic valve 90 has three different ports; an inlet port communicated with the accumulator 100, an outlet port communicated with the member 11 and a third port communicated with the internal space of the ink reservoir 130. The valve 90 is of the type having a plunger (not shown) which will recede when the coil of the valve is energized so as to provide communication between the inlet and outlet ports while blocking the third port. When the coil is deenergized, the plunger of the valve 90 will be advanced by the action of a coil spring to a position where it closes the inlet port and communicates the outlet port with the third port. The reference numeral 110 denotes a pump which comprises a single electric coil (not shown), a plunger in the form of a polarized permanent magnet, a diaphragm and a spring-biased ball valve. The electric coil will be supplied with a current alternately in opposite directions such that the plunger is driven for reciprocation to suck and discharge ink alternately. The amount of ink delivery from the pump 110 depends on the switching frequency of the current supply thereto as well as the value of the current. The electrode unit 80 for detecting the deflection position comprises a plate-like charge detecting electrode 80a, one side of which is open such that it catches all the ink droplets ejected from the monitoring hole $14a_m$ of the nozzle plate 14 regardless of the amounts of deflection. Additionally, of the forty levels of charged ink droplets, those which follow a predetermined deflection path and paths above the same will not impinge on the electrode 80a but those flying through the paths below the predetermined one will impinge on the electrode 80a.

A print control section for charging phase search and deflection control is illustrated in FIG. 1b. A phase setting circuit 190 of the print control section includes a counter 190a which is supplied with clock pulses $CK_1$. The counter 190a is a ring counter that upcounts the clock pulses $CK_1$ to "8" and counts "9" as "0". More specifically, while clock pulses $CK_1$ are arriving in succession, the counter 190a counts them as "0", "1", "2", . . . , "8", "0", "1", "2", . . . , "8", "0", "1", "2" . . . Output codes of this counter 190a are coupled to a decoder 190b. Accordingly, each time a clock pulse $CK_1$ arrives at the counter 190a, the decoder 190b shifts its high level or "1" output successively at its output terminals 0–7. Consequently, the individual output terminals 0–7 of the decoder 190b produce phase search pulses which have a common phase difference corresponding to the period $T_1$ of the clock pulses $CK_1$ relative to each other and have a duration of $T_1$ which is $\frac{1}{8}$ of a period $T_8$ of ink droplet production. These eight sets of phase search pulses are supplied to individual AND gates 0–7 of a first AND gate group $AG_1$ and also to paired OR gates 0–7 of an OR gate group $OG_1$, respectively. Outputs of the OR gates of the OR gate group $OG_1$ are fed to AND gates 0–7 of a second AND gate group $AG_2$. As will be described, during a phase search, all of the AND gates of the second group $AG_2$ are closed and a selected one of the AND gates of the first group $AG_1$ is opened whereby a specific one of the phase search pulses or outputs at 0–7 of the decoder 190b is passed through an output OR gate $OR_1$ to a monitoring charge signal generator 200 which will be described hereinafter. Which one of the AND gates of the first group $AG_1$ is to be opened depends on the output of a second decoder 190c which is supplied with count codes of a second counter 190d. Clearing and upcounting of the second counter 190d are controlled by a central controller or central control device or unit 240. For a phase searching operation, the central control device 240 first clears the counter 190d so that the signal level at the output terminal 0 of the decoder 190c becomes high or "1". This opens the AND gate 0 of the first group $AG_1$ to deliver a phase search pulse appearing at the output terminal 0 of the decoder 190b to the monitor charge signal generator 200. For the duration of this phase search pulse, the charge signal generator 200 applies a charging voltage to a monitor charging electrode 20$a_m$. Observing the output of a charge detection circuit 210 which is connected to a monitor charge detecting electrode 40$a_m$, the central control device 240 supplies the counter 190d with one pulse if the output level of the charge detector 210 has not become "1" indicative of "charged" in a predetermined period of time after the clearing of the counter 190d. Then the signal level at the next output terminal 1 of the decoder 190c becomes "1" whereby the AND gate 0 of the first group $AG_1$ is closed and the AND gate 1 is opened to pass the second set of phase search pulses or output pulses at the terminal 1 of the decoder 190b to the charge signal generator 200 through the OR gate $OR_1$. It will be seen here that the pulses thus coupled to the charge signal generator 200 have a phase delay of $T_1$ relative to the preceding set of phase search pulses. Again, the central control device 240 observes the output level of the charge detector 210 and keeps on feeding pulses to the counter 190d until the output level becomes "1", causing the counter 190d to count up. When a "1" output indicative of "charged" is supplied from the charge detector 210 to the central controller 240, the latter supplies no more pulses to the counter 190d since an optimum charging phase has been determined. Then the central controller 240 supplies all of the AND gates 0–7 of the second group $AG_2$ with ON or "1" signals therefrom. Supposing that the count at the counter 190d existing at that instant is "3", the signal level at the output terminal 2 of the decoder 190c is "1" opening the AND gate 2 of the first group $AG_1$ and the AND gate 2 of the second group $AG_2$. A third set of phase search pulses are therefore supplied from the AND gate 2 of the group $OG_1$ to the OR gate $OR_1$ while an output of the OR gate 2 of the group $OG_1$ which is the combination of phase search pulses of the second and fourth sets is coupled to the OR gate $OR_1$. Stated another way, if it is the third set of phase search pulses that corresponds to the optimum charging phase, the OR gate $OR_1$ supplies the charge signal generator 200 with a print charge pulse which is the sum (logical sum) of a pulse of the third set and those of the second and fourth sets on opposite sides of the third set, or a pulse having the search setting pulse at its center and lasting a duration of $3T_1$ which is three times as long as the duration of said pulse. Making the duration of phase search pulses short and that of print charge pulses long functions to detect a charging phase accurately through phase search and ensure positive charging for printing. It will be noted in FIG. 1b that the mechanical arrangement is shown with the monitoring ink ejection hole 14$a_m$ at the center and with the monitoring charging electrode 20$a_m$ and onward in sectional plan view.

As already described, the monitor charge electrode 20$a_m$ is supplied with a charging voltage from the charging signal generator 200 as long as an output print charge pulse ("1" level) of the phase setting circuit 190 lasts. The charge signal generator 200 comprises a standard code setter 200a loaded with a standard charging voltage code of the maximum deflection level (lowest value of the charging voltage of the maximum deflection level), an up-down counter 200b, eleven AND gates 0–10 constituting a third AND gate group $AG_3$, a digital-to-analog converter 200c and a voltage amplifier 200d. Up- and down-counting actions of the counter 200b are controlled by the central control device 240. All of the AND gates of the third group $AG_3$ remain opened while a print charge pulse appears. The standard charge voltage is determined such that, when it is coupled to the monitor electrode 20$a_m$, ink droplets charged thereby necessarily impinge on the electrode 80a regardless of the conditions. Connected with the electrode 80a is a deflection detection circuit whose major component is an integration circuit. The integration circuit, generally 220, comprises a capacitor C for integration, a metal oxide silicon field effect transistor (MOS FET) FET2 for resetting (discharging the capacitor C), an FET1 for voltage conversion, an operational amplifier (op amp) OPA4, a comparator COM1, a transistor $Tr_1$ for rendering the FET2 conductive when the control signal is (logical) "1" commanding resetting (reset signal), an inverting amplifier AM2, etc. Designated LED is a light emitting diode for displaying a proper deflection condition. The LED constitutes notifying means in combination with an inverting amplifier AM1 which is connected therewith. A reset signal input terminal of the integrator 220 (input terminal of AM2) and an energize signal input terminal of the notifying means are commonly connected to a control signal conductor DS which in turn is connected to the microcomputer of the central control unit 240, i.e. control means.

In the illustrative embodiment, the integrator 220 is constructed such that the capacitor C is discharged (reset) to the ground level when the FET2 has been conducted longer than 0.25 msec. Concerning the light emitting diode LED, one will not see it flashed when the duration of a pulse applied to the diode is shorter than 1 msec and will see it flashed if otherwise. Therefore, when a pulse which remains high level, or "1", for a duration shorter than 1 msec is applied to the control signal conductor DS, emission of light from the emitting diode LED will not be noticed although tha capacitor C of the integrator 220 is discharged to the ground level. When a pulse which remains high level, or "1", for a duration longer than 1 msec is applied to the control signal conductor DS, the capacitor C of the integrator 220 is discharged to the base state and, at the same time, light emission from the light emitting diode LED is recognized.

When charged droplets impinge on the charge detecting electrode 80$a$ after the resetting of the integrator 220, the capacitor C is charged little by little every time a droplet impinges on the electrode 80$a$. The charged voltage is subjected to voltage conversion at the FET1 and, then, applied to the op amp OPA4. The output of the op amp OPA4 is routed to the comparator COM1. In the illustrative embodiment, a reference voltage Vref applied to the comparator COM1 has a value lower than an output voltage of the op amp OPA4 which appears after impingement of time-serial 256 droplets on the electrode 80$a$. In this construction, by checking an output of the integrator 220 upon the generation of 256 drops after resetting of the integrator 220, it is possible to determine that droplets are impinging on the electrode 80$a$ if the integrator output is "1" indicative of "CHARGE DETECTED" and they are not impinging on the electrode 80$a$ if the integrator output is "0".

Therefore, whether the deflected position of droplets coincides with the position where they will impinge on the electrode 80$a$ can be determined by resetting the integrator 220 after the phase search, then counting the clock pulses $CK_1$, and then checking an output of the integrator after, for example, 256×8 clock pulses $CK_1$ have been counted, that is, after 256 drops have been generated after the resetting. A "1" output of the deflection detector 220 indicates insufficient deflection. The central control device 240, if the output level of the circuit 220 is "1", conditions the up-down counter 200$b$ of the charge signal generator 200 for an up-counting mode and supplies one pulse thereto while momentarily resetting the deflection detector 220. Also, counting the clock pulses $CK_1$, the central control device 240 again checks the output level of the deflection detector 220 when the count reaches a predetermined value and causes the counter 200$b$ to keep on upcounting for thereby adjusting the charge voltage. A count code of the counter 200$b$ which will appear when the output level of the circuit 220 turns to "0" shows a charge voltage necessary for directing ink droplets to a predetermined maximum deflected position, i.e. a charge voltage of the 40th step. As will be described, the central controller 240 based on the charge voltage code determines the 1st to 40th steps of charge voltages and delivers them sequentially from the first step to the 40th step at the period of $T_0=8T_1$ in timed relation with the production of ink droplets. Upon delivery of the 40th charge voltage code, the central controller 240 repeats the delivery of the same series of charge voltage codes starting from the 1st step. The charge voltage codes are processed by a digital-to-analog converter 250 into analog signals and passed to individual print charge signal generators 200$a_i$ connected with the individual charging electrodes 20$a_i$ which are associated with the printing ink ejection holes 14$a_i$ of the nozzle plate 14 within the recording width of the latter.

Each of print charge signal generators 200$a_i$ has a construction depicted in FIG. 1$c$. The number of the generators 200$a_i$ installed in the apparatus is the same as that of the charging electrodes 20$a_i$ for printing. The generators 200$a_i$ are commonly supplied with output snalog signals from the digital-to-analog converter 250. In the charge signal generator shown in FIG. 1$c$, an output of the digital-to-analog converter 250 is coupled to a MOS FET disignated as FET3 in the drawing. This FET3 receives an output of an AND gate $AN_1$ and its gate and supplies its output to a voltage amplifier 200$d_a$ whose output is in turn coupled to a charging electrode 20$a_i$. Applied to two input terminals of the AND gate $AN_1$ are a print charge pulse $S_{ct}$ which is an output of the phase setter 190 and an image signal (having a "1" level indicative of recording and a "0" level indicative of non-recording). Only when the image signal level is "1", a print charge pulse $S_{ct}$ is supplied to the voltage amplifier 200$d_a$ which then applies a charging voltage to the electrode 20$a_i$. It will be noted that, where the central controller 240 is to supply the charge voltage generators 200$a_i$ for printing with charge voltage codes $S_{cc}$, each of charge voltage generators 200$a_i'$ may be furnished with AND gates of a third AND gate group $AG_{3a}$ and a digital-to-analog converter 200$_{ca}$ in the same way as the monitor charge voltage generator 200 as indicated in FIG. 1$d$ of the drawing.

Concerning the central control device 240, it comprises a central processing unit or CPU which may be constituted by a microprocessor, a semiconductive read only memory ROM, a semiconductive random access memory or RAM and a microcomputer of one or several chips having input/output ports (not shown). The read-only memory stores therein program data for practicing the afore-mentioned various control, constant data which will be referred to for such programs, and other additional program and constant data. The central controller 240 controls printing operation in cooperation with an image signal processing control unit (not shown) on the image signal delivery side of the apparatus.

Reference will be made to the flowcharts shown in FIGS. 2$a$–2$d$ for describing the operation of the central control unit 240 which, in the illustrative embodiment, serves as control means for resetting the integrator 220, reading a charge detection signal out of the integration 220, and controllably energizing the light emitting diode. As a part of the constant data, the read-only memory of the central controller 240 stores the 1st to 40th steps of standard charge voltage $V_{cl}$–$V_{c40}$ under standard conditions wherein ink droplets would impinge on the electrode 80$a$ when ejected at a pressure indicated by the standard code and charged with a voltage of the 40th step indicated by a reference code. For the convenience of description, regions of the read-only memory which store such data will be referred to as standard charge voltage storages or simply storages 1–40 as shown in Table 1.

TABLE 1

| STORED REGION | STORED DATA IN ROM<br>STORED CONTENT |
|---|---|
| STORAGE 1 | standard charge voltage $V_{c1}$ for deflection to 1st position |
| STORAGE 2 | standard charge voltage $V_{c2}$ for deflection to 2nd position |
| STORAGE 3 | standard charge voltage $V_{c3}$ for deflection to 3rd position |
| . | . |
| . | . |
| . | . |
| STORAGE 40 | standard charge voltage $V_{c40}$ (set code of 200a) for deflection to 40th position |

Meanwhile, the random access memory of the central controller 240 has predetermined regions for temporary storage. These specific regions will be referred to as registers for convenience and, in relation with the flowchart, they store contents shown in Table 2.

TABLE 2

| MEMORY REGION | READ/WRITE MEMORY DATA IN RAM CONTENT |
|---|---|
| TIMER 1 REGISTER | count of $CK_1$ for counting time |
| TIMER 2 REGISTER | " |
| COUNTER 1 REGISTER | " |
| COUNTER 2 REGISTER | number of formed ink droplets (for deflection detection) |
| CHARGE VOLT REGISTER 1 | $S_{cc}$: charge voltage $V_{a1}$ actually applied to $20a_i$ for 1st deflection position |
| CHARGE VOLT REGISTER 2 | $S_{cc}$: charge voltage $V_{a2}$ actually applied to $20a_i$ for 2nd deflection position |
| CHARGE VOLT REGISTER 3 | $S_{cc}$: charge voltage $V_{a3}$ actually applied to $20a_i$ for 3rd deflection position |
| . | . |
| . | . |
| . | . |
| CHARGE VOLT REGISTER 40 | $S_{cc}$: charge voltage $V_{a40}$ actually applied to $20a_i$ for 40th deflection position |
| COEFFICIENT REGISTER | voltage $V_{m40}/V_{c40}$ indicated by count code of counter 200b |
| COUNTER 4 REGISTER | number of $CK_1$ (for frequency division) |
| COUNTER 5 REGISTER | number of formed ink droplets (for switching charge voltage) |

Figure 2A:
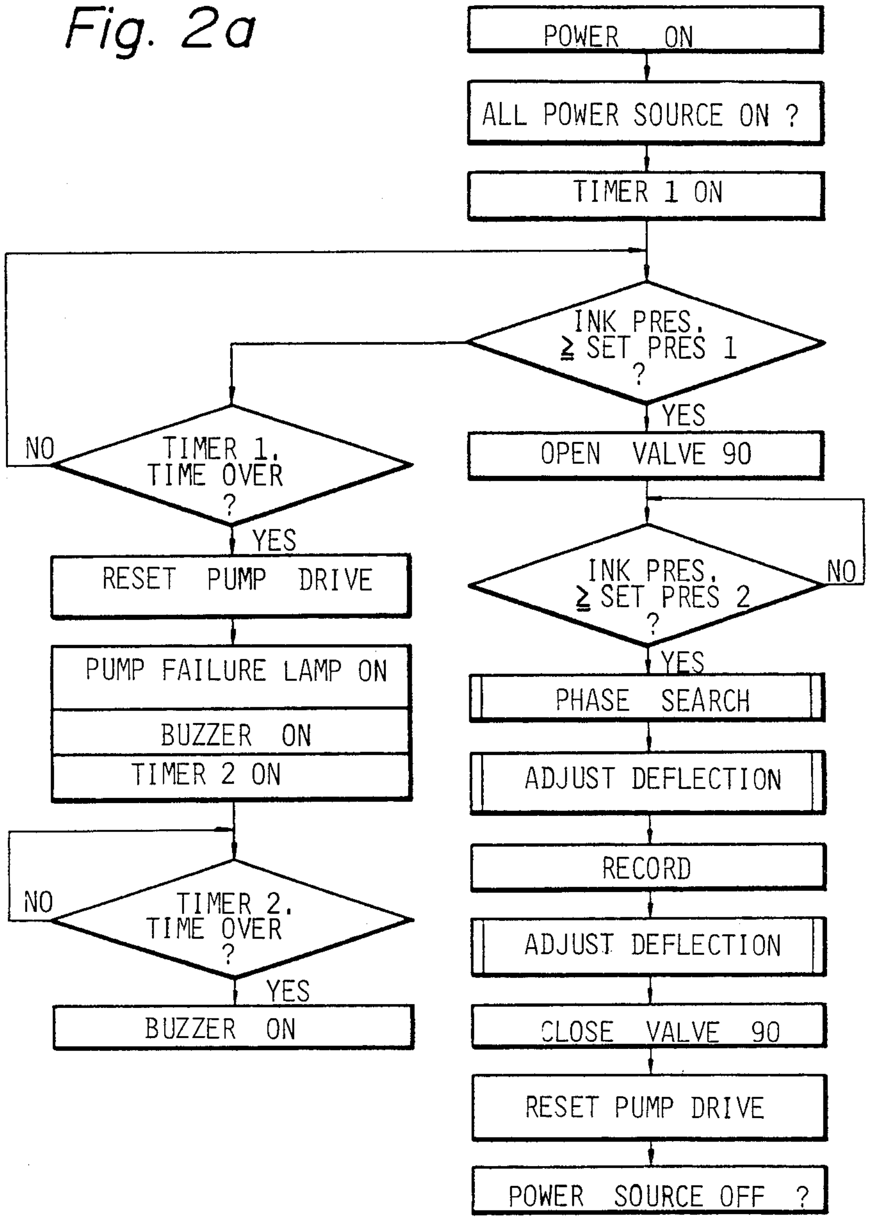
* and FIGS. 2*a,* 2*b,* 2*c* and 2*d* are flowcharts demonstrating a control operation performed by a central control unit.

Referring first to FIG. 2*a*, the operation of the central controller 240 will be outlined. When power is supplied to the central controller 240 from its associated power source, it turns on power sources for various units and circuits which it is to control (FIGS. 1*a*, 1*b* and 1*c*) according to a predetermined sequence and starts counting the clock pulses $CK_1$. This action is performed on the basis of a count program according to which "1" is added to the content of the timer 1 register every time a clock pulse $CK_1$ arrives and the sum is stored anew in the timer 1 register. As the timer 1 register reaches a predetermined value meaning "time over", the central controller 240 checks the ink pressure and, if the ink pressure is higher than a first reference pressure 1, it energizes the electromagnetic valve 90 for thereby establishing communication between the accumulator 100 and ink jet head 10. If the ink pressure remains lower than the reference level 1, after the timer 1 register has reached the reference value or under a "time over" condition, the central controller 240 turns off the power sources for pump drive and control circuits and for printing actions while latching a failure indication lamp and a buzzer in their energized states. At the same time, the central controller 240 starts adding "1" to the timer 2 register in synchronism with the clock pulses $CK_1$ and storing the sums anew in succession (timer 2 ON). As the timer 2 register exceeds a predetermined count meaning "time over", the buzzer is deenergized but the lamp is kept turned on. As already stated, then the ink pressure rises beyond the reference value 1 and the valve 90 is opened, ink will be ejected from the head 10 resulting in a temporary drop of the ink pressure. To cope with this, the central controller 240 waits until the ink pressure exceeds a second reference level 2 and then performs phase search which is followed by adjustment of the amount of deflection. After the adjustment of the deflection amount, the central controller 240 informs the image signal delivery side of the end of preparation for recording operation and demands the supply of image signals. The central controller 240 in this way performs its actions for reproducing images on the recording sheet. During printing operation, the central controller 240 carries out phase search and adjustment of deflection amount in response to phase search commands and deflection adjustment commands which will be applied thereto from the image signal delivery side. Upon completion of the printing operation, the central controller 240 in response to an end command from the image signal delivery side first deenergizes the valve 90 and then turns off the power source associated with the pump drive and control circuit and then turns off the power sources for the other units and circuits (FIGS. 1*a*, 1*b* and 1*c*). The power source associated with the controller 240 proper is turned on and off by the image signal delivery side.

Figure 2B:
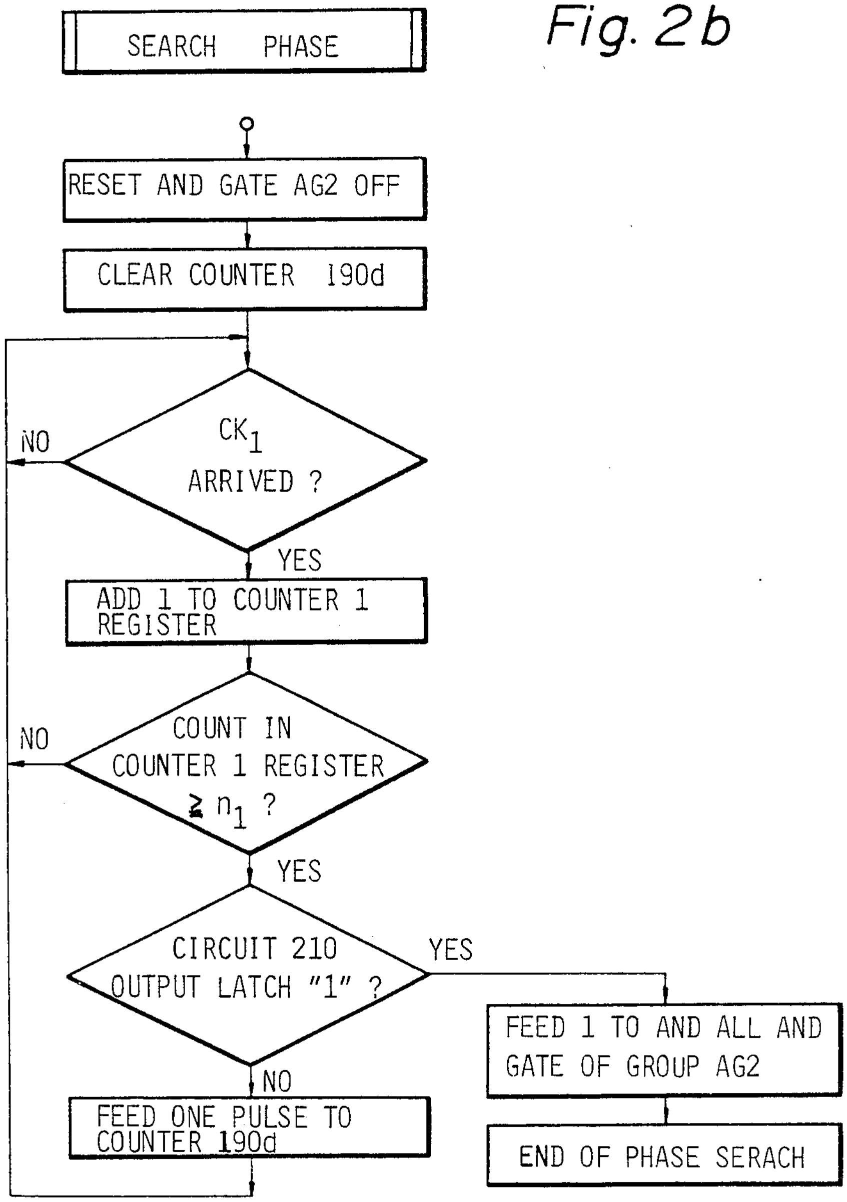
Figure 2C:
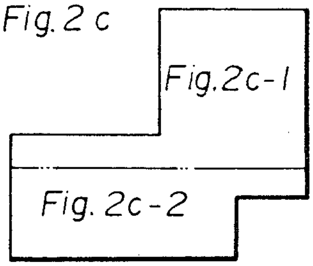
Figures 1, 2C:
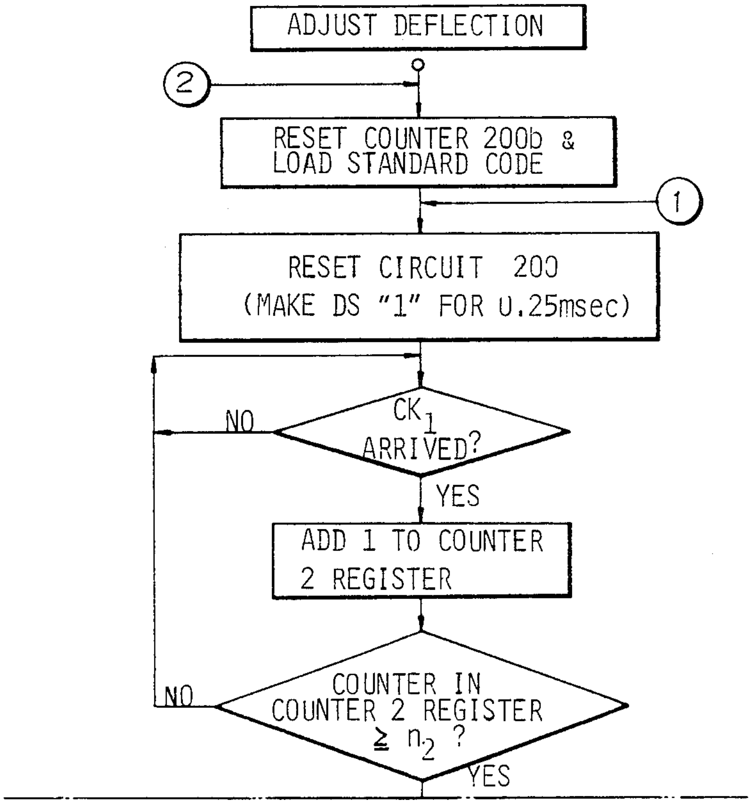
Figure 2D:
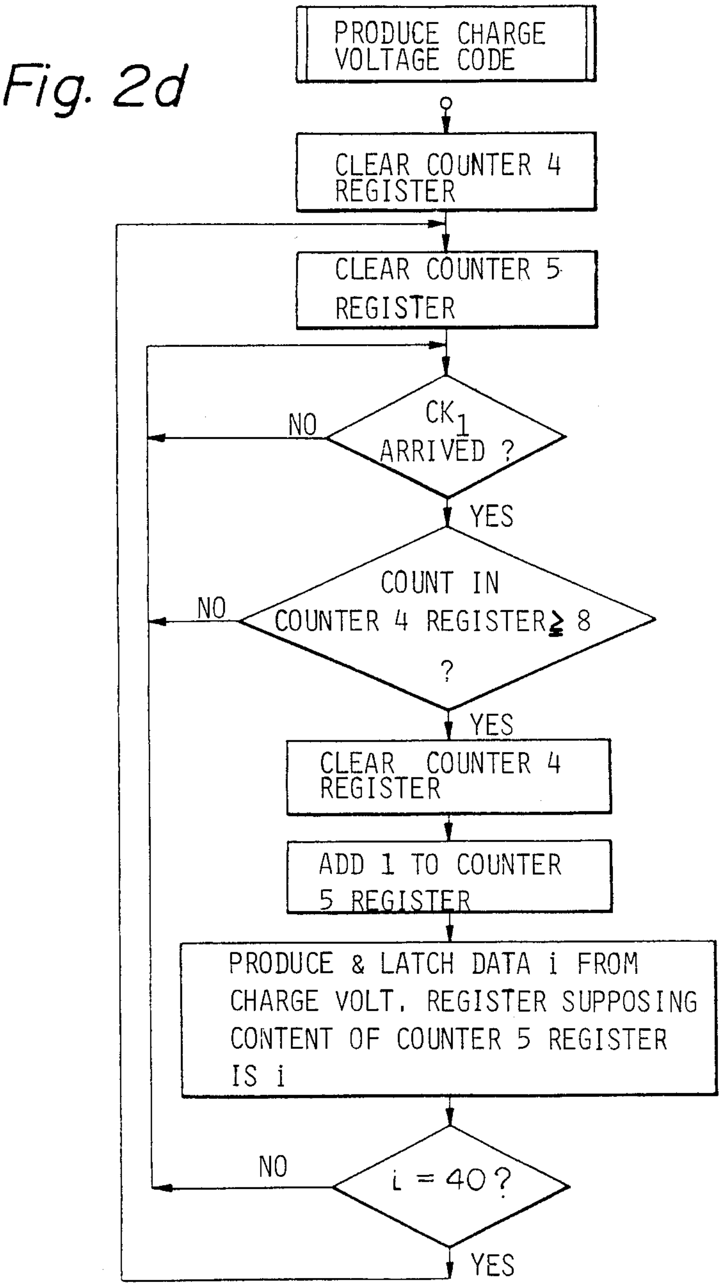

Referring to FIGS. 2*b*–2*d*, there will be described in detail those operations of the central controller 240 for searching a phase, adjusting the amount of deflection and setting a charge voltage during printing action.

Concerning the phase searching procedure, the central controller 240 first closes all of the AND gates 0–7 of the second group $AG_2$ in the phase setter 190 (output latch reset of the controller 240) and clears the counter 190*d* as shown in FIG. 2*b*. In this situation only the AND gate 0 of the first group $AG_1$ remains opened so that only the first set of phase search pulses (appearing at the output terminal 0 of the decoder 190*b*) are coupled to the monitor charge signal generator 200. The controller 240, counting the clock pulses $CK_1$ (the counter 1 register storing the number of received clock pulses $CK_1$), checks whether the charge detector 210 has latched a "1" output when the count of the clock pulses increases beyond a predetermined number $n_1$, that is, after the formation of a predetermined number of ink droplets. If not "1", the controller 240 supplies one pulse to the counter 190*d*. At this instant, the decoder 190*c* switches the "1" level output from the output terminal 0 to the output terminal 1 whereby the AND gate 1 of the first group $AG_1$ is allowed to pass the second set of phase search pulses (output terminal 1 of the decoder 190*b*) therethrough to the monitor charge signal generator 200. Upon lapse of a predetermined period of time, the controller 240 refers to the output level of the charge detector 210 and, if it is "0", again supplies one pulse to the counter 190*d*. In this way, the phase search pulses applied to the monitor charge signal generator 200 are shifted by $T_i$ each within the droplet forming period $T_8 = 8T_1$ where $T_1$ is the period of the clock pulses $CK_1$. An output code of the counter 190*d* which appears when the output of the charge detector 210 becomes "1" meaning the "charged" state of the ink droplets indicates the phase search pulses which properly charge the ink droplets. After this phase search, the controller 240 opens all of the AND gates 0–7 of the second group $AG_2$ and latches them in this state. Then the OR gate $OR_1$ is allowed to produce print charge pulses each having a proper phase search pulse at the center and lasting a duration of $3T_1$ which is three times as long as that $T_1$ of the proper phase search pulse.

For the adjustment of the deflection amount, the central controller 240 operates as will be described with reference to FIG. 2*c*. The controller 240 first resets the counter 200*b* and loads it with a standard code so that the 40th step of standard charge voltage is applied to the charging electrode 20$a_m$.

Next, the integrator 220 is reset by applying to it a pulse which remains high level, or "1", for 0.25 msec which is too short for light emission from the light emitting diode to be visually recognized. Under this condition, counting generated droplets is started. Upon the increase of the count beyond a predetermined value, the central controller 240 sees an output of the integrator 220 and, if it is "1" ($V_{c0}$ is predetermined such that "1" necessarily holds at the first time), increments the counter 200*b* and applies one pulse thereto to reset the integrator 220, counts generated droplets, and again sees an output of the integrator 220 when the count reaches a predetermined value. Such a procedure consisting of incrementing the counter 200*b*, resetting the integrator 220 and counting generated droplets is repeated until the output of the integrator 220 becomes "0". When the output of the integrator 220 has turned to "0", the controller 240 sees that the charge detector 210 is detecting charged drops. If the output of the charge detector 210 is "1", the controller 240 sets "1" in the control signal conductor DS (to energize the light emitting diode LED) and sets a 2.5 msec timer, because droplets have then been charged and an optimum deflection has been set up.

Thereafter, a charge voltage $V_{m40}$ represented by a count code output from the counter 200*b* is divided by the standard charge voltage $V_{c40}$ which is stored in the storage 40 of the ROM, thereby storing a compensation coefficient $V_{m40}$ in a coefficient register. The product of the data $V_{c40}$ stored in the storage 40 of the ROM and the compensation coefficient $V_{c40}$, i.e. $V_{a40}$, is stored in the charge voltage register 40 (Table 2). This is followed by storing in the charge voltage register 39 a value $V_{a39}$ which is produced by multiplying the data $V_{c39}$ in the storage 39 of the ROM by the compensation coefficient $V_{m40}/V_{c40}$. Such a procedure is repeated thereafter. Finally, a value $V_{al}$ produced by multiplying the data $V_{cl}$ stored in the storage 1 of the ROM by the compensation coefficient $V_{m40}/V_{c40}$ is stored in the charge voltage register 1.

After so setting a charge voltage, the controller 240 sees if the time assigned to the 2.5 msec timer is over and, if it is not over, waits until the end of the time and, if it is over, returns the signal level of the control signal conductor DS from "1" to "0" to deenergize the light emitting diode LED, thus completing the adjustment of deflection. When the deflection of charged droplets has been adjusted to a predetermined amount by the above procedure (i.e. when the charge detecting electrode and integrator 220 have come to detect no droplet impingement), the light emitting diode LED is energized for more than 2.5 msec and the emission of light is visually recognized to see that the charge and deflection have been completely adjusted.

As shown in FIG. 2*d*, during printing operation, the central controller 240 sequentially latches data our of the storages 1–4, returns to the storage 1 after reading data out of the storage 1 and, in this manner, circulates through the storages.

In summary, it will be seen that the present invention provides a charged droplet detection device for an ink jet printer which, using a common control input line for both an integration circuit (220) responsive to charged droplets and a notification circuit (LED, AM1), reduces the required number of signal lines and, thereby, the number of additional circuit elements. While the device of the present invention has been shown and described in relation with adjustment of a deflection amount, it will be apparent that it is similarly applicable to the detection of charged ink droplets in a phase search mode or any other desired mode.

Various modifications will become possible for those skilled in the art after receiving the teachings of the present disclosure without departing from the scope thereof.

What is claimed is:

1. A device for detecting charged ink drop in an ink jet printer, comprising:

a charge detecting electrode for detecting a charged ink drop;

integration means provided with an integrator for integrating a detection signal output from said charge detecting electrode, said integration means being further provided with resetting means, said integration means clearing an integrated value within a first period of time;

notification means for generating an recognizable notification when energized for a second period of time which is longer than said first period of time;

a control signal conductor connecting to a reset signal input terminal of the resetting means of the integration means and an energizing signal input terminal of the notification means; and control means for applying a reset command signal having a duration which is longer than said first period of time and shorter than said second period of time, temporarily in the event of charge detection.

2. A device as claimed in claim 1, in which the notification means comprises a light emitting diode and an amplifier for applying an energizing current to said light emitting diode.

3. In an ink jet printer including detector means for periodically performing a detection operation for detecting an ink drop in an ink jet having an electrical charge exceeding a predetermined value and producing a detection signal in response to said detection, the combination comprising:

notification means for generating a recognizable notification;

control means responsive to the detector means; and a signal line connecting an output of the control means to an input of the notification means and to a reset input of the detector means;

the control means applying a reset signal to the signal line when the detector means has completed a detection operation and has not produced the detection signal;

the control means applying a notification signal to the signal line when the detector means has completed a detection operation and has produced the detection signal;

the reset signal having a duration long enough to reset the detector means but not long enough to cause the notification means to generate the recognizable notification;

the notification signal having a duration long enough to reset the detector means and cause the notification means to generate the recognizable notification.

4. The combination as claimed in claim 3, in which the detector means comprises an integrator.

5. The combination as claimed in claim 3, in which the notification means comprises a light emitting element.

* * * * *